Sept. 7, 1926.
J. S. MOORE
1,599,182
GLASS WORKING MACHINE
Filed March 15, 1921    5 Sheets-Sheet 1
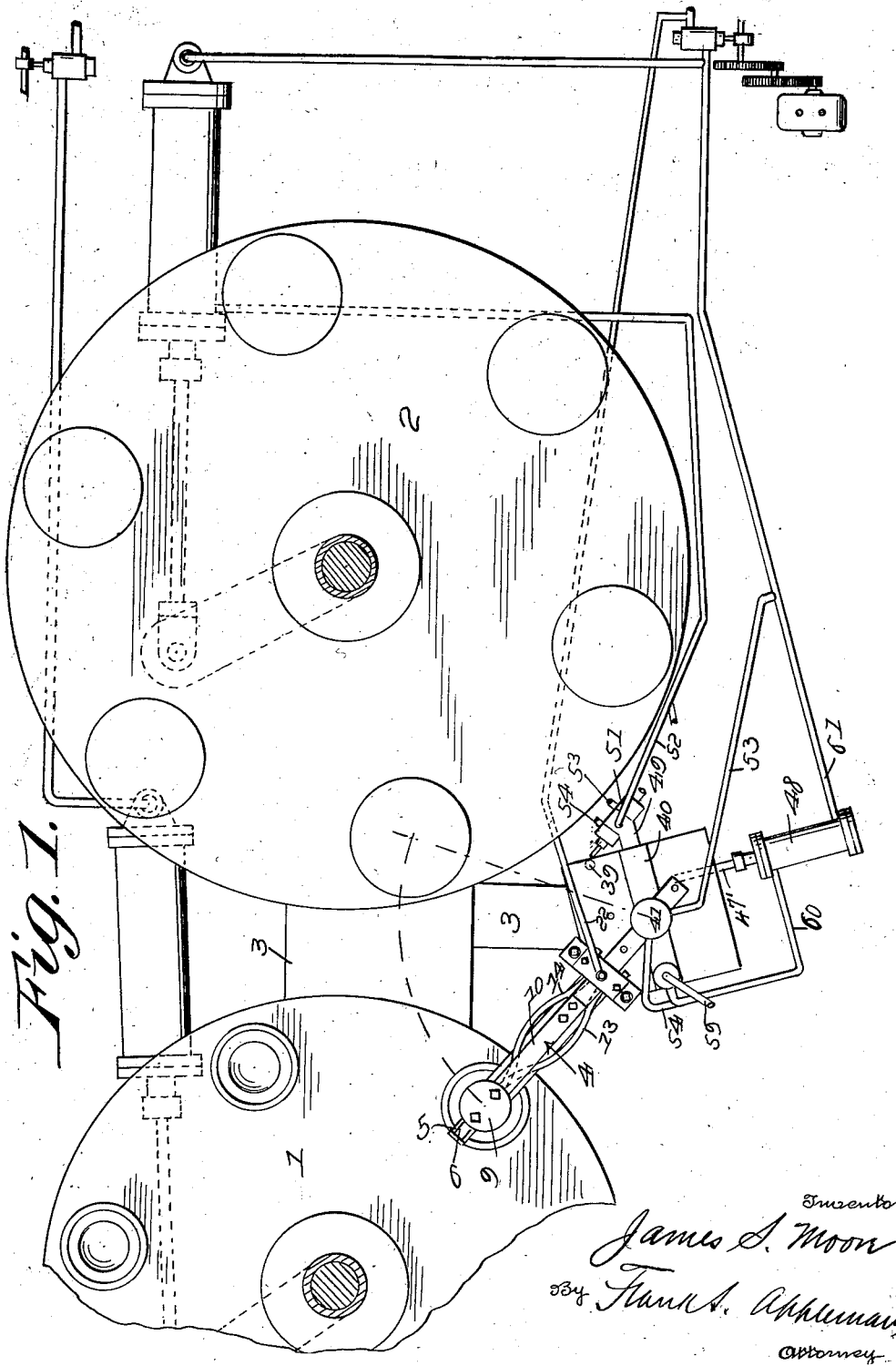

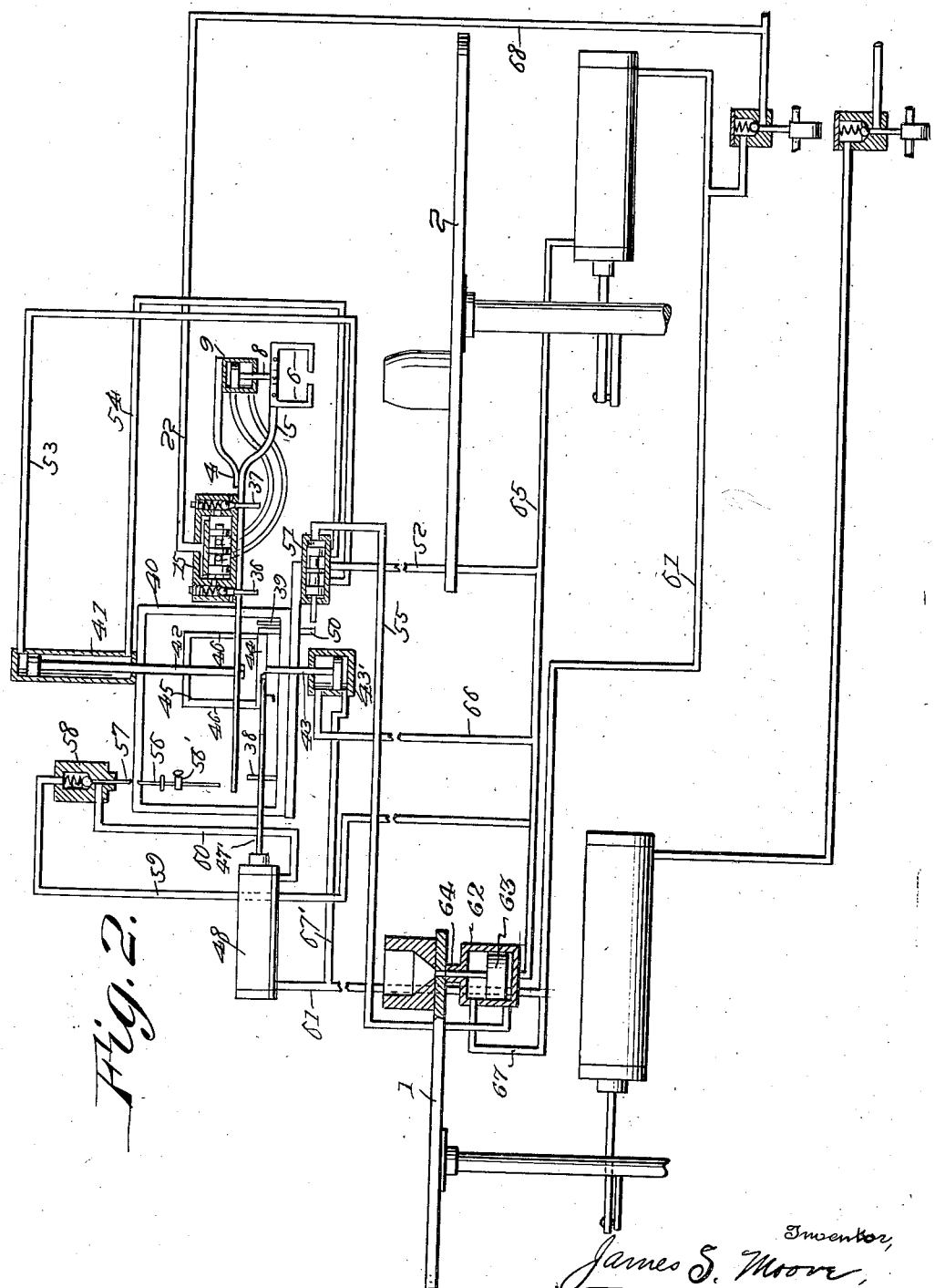

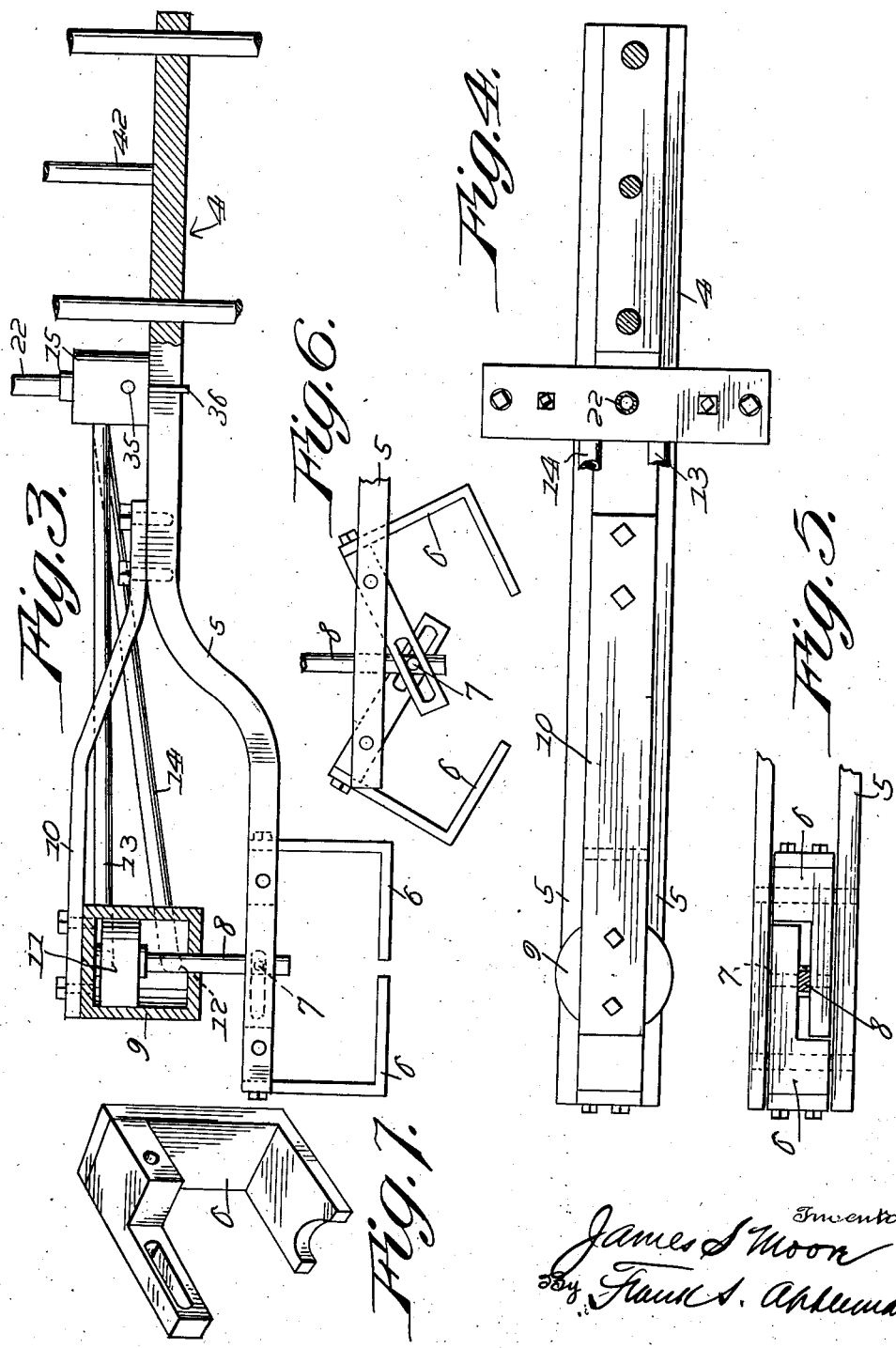

Sept. 7, 1926.
J. S. MOORE
1,599,182
GLASS WORKING MACHINE
Filed March 15, 1921  5 Sheets-Sheet 4
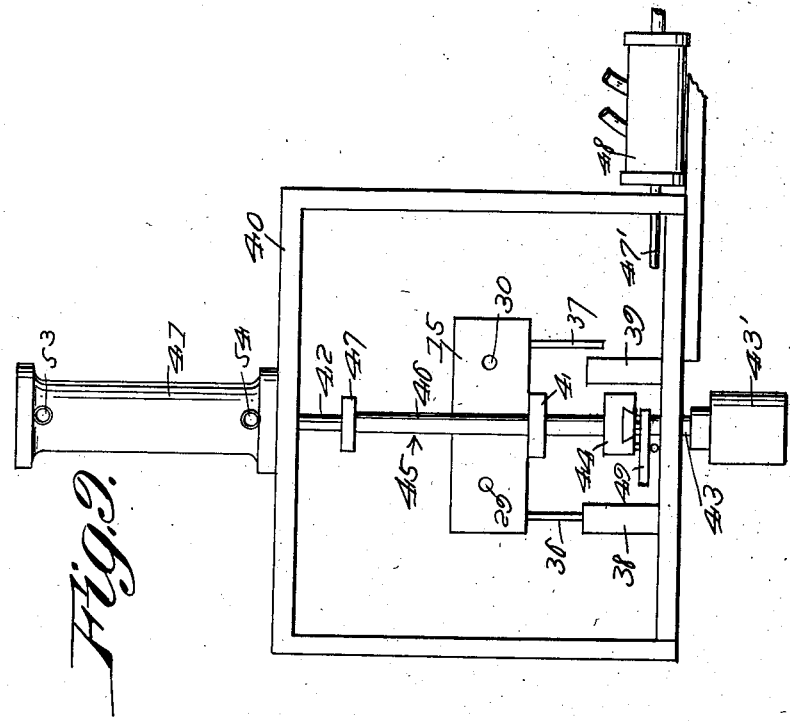
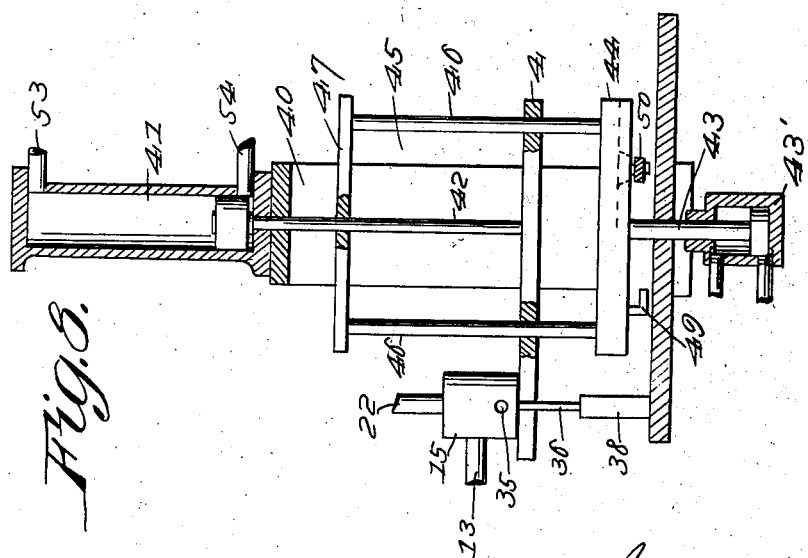

Sept. 7, 1926.  
J. S. MOORE  
GLASS WORKING MACHINE  
Filed March 15, 1921
1,599,182
5 Sheets-Sheet 5
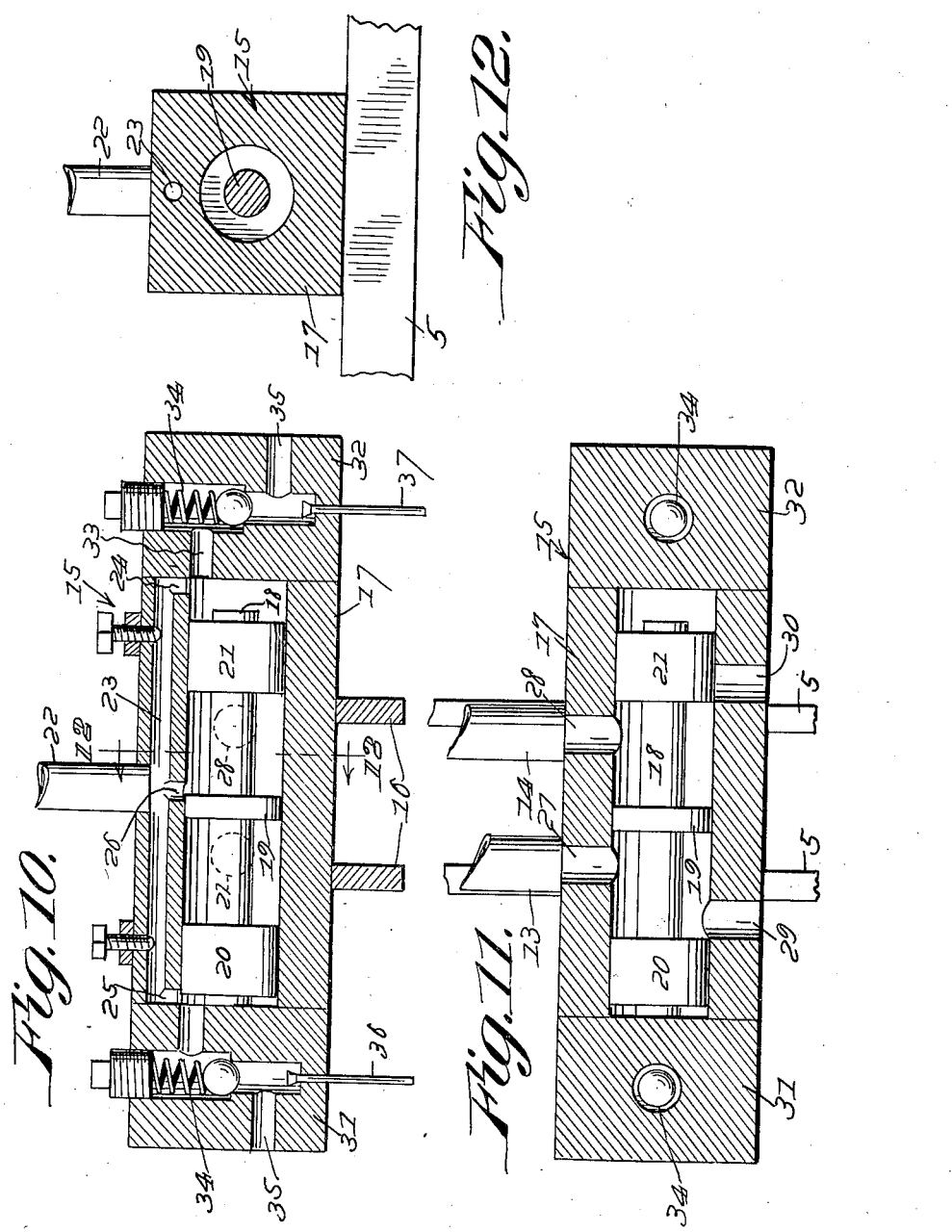

Patented Sept. 7, 1926.

1,599,182

UNITED STATES PATENT OFFICE.

JAMES S. MOORE, OF GRAFTON, WEST VIRGINIA.

GLASS-WORKING MACHINE.

Application filed March 15, 1921. Serial No. 452,410.

This invention relates to certain improvements in glass working machines of that type which are used in the production of hollow ware, which in the process of manufacture the molten glass is placed in a parison mold from which it is transferred to another mold and then blown, for instance, bottles, jars and the like; but more particularly to glass containers having openings which are adapted to be closed by internal or external stoppers and which are designated as wide mouth containers, for instance, fruit-jars and milk bottles.

The glass working machine to which my invention is applicable has a rotatable table for the receiving molds and adjacent thereto is another rotatable table for the blowing molds, the movements being intermittent, and effected by means actuated preferably by compressed air, the transfer mechanism being an improvement upon that type of transfer used with glass working machines, such as is shown and described in United States Letters Patent No. 1,515,962 issued to W. J. Miller, November 18, 1924.

In a combined pressing and blowing machine for making pressed and blown jars and the like from molten glass, the parison molds for the parison and those for blowing are different as to construction and dimensions, the tables are usually in the same horizontal plane and are spaced apart. In practice it becomes necessary to transfer the partly shaped parison from the table which carries the parison molds to the blowing table, and the present application is directed more particularly to the transfer device, and the means for operating the same, such means being coordinated to operate synchronously with the movements of the tables.

A transfer mechanism that accords with my invention is of such construction that the mold parison receiver in which the plastic glass or parison is placed and partially shaped, will be raised by the kick-out for the parison mold, and when in such raised or lifted position, will be grasped by the jaws of the transfer mechanism being carried thereby and deposited in a blowing mold on an adjacent table, the movements of the transfer mechanism being only vertical and horizontal, thus avoiding any angular inclination of the parison.

The invention forming the subject matter of this application includes a transfer arm or member that is mounted for oscillation and is provided with clamping jaws for engagement with the parison to position the same in the blowing mold, such transfer device being actuated by fluid pressure preferably compressed air.

My invention also consists in the construction, arrangement and combination of the parts which are made up and coordinated to operate synchronously with the movements imparted to the tables, as will be hereinafter set forth and claimed.

In the accompanying drawings which illustrate one form of my invention,—

Figure 1 illustrates a plan view showing my improved transfer applied to a glass working machine having a table for the parison-molds and a table for the blow-molds, and in this view the clamp of the transfer is shown in position for engagement with the parison;

Figure 2 illustrates a diagrammatic side elevation, parts being in section;

Figure 3 illustrates a side elevation, partly in section of a portion of the transfer member;

Figure 4 illustrates a plan view of the transfer member as shown by Fig. 3;

Figures 5, 6 and 7 illustrate detail views of the clamps or parison engaging members of the transfer;

Figure 8 illustrates a view partly in section of means for effecting vertical and oscillatory movement of the transfer member;

Figure 9 illustrates an end elevation of the parts shown by Fig. 8;

Figures 10 and 11 illustrate longitudinal sections of a control valve which is carried by the transfer arm; and Figure 12 illustrates a section taken on the line 12—12 of Fig. 10.

The drawings forming part of this application show my invention applied to a glass working machine, having parison molds or receivers in which molten glass is first placed, the parison being partly shaped therein, and subsequently transferred to a blow-mold on an adjacent table, as in the manufacture of bottles, fruit jars and other containers.

My improvements are directed toward providing means for effecting the transfer automatically and to provide means whereby compressed air from a source that tapped for blowing is connected up with the means for actuating the transfer mechanism.

Referring to Fig. 1 of the drawings, a table 1 for parison-molds is mounted upon a suitable support which also carries a table 2 for the blow-molds. The tables are mounted for rotation, as usual, by means of piston rods of cylinders, the piston rods being connected to oscillatory arms, the cylinders being connected with an air supply piping system. The tables 1 and 2 are on the same horizontal plane and the frame therefor is provided with a support 3 for a transfer mechanism, by means of which the partially shaped parison is transferred to table 2 upon which it is completed.

The transfer mechanism consists of an arm 4 having downwardly extending end portions 5, 5 between which are pivoted complementary members 6, 6 of a clamp, the grasping ends thereof being recessed to engage with the partly shaped parison, the upper members of the clamp being reduced and slotted for engagement with a transverse pin 7 attached to a piston rod 8. The cylinder 9 for the piston rod 8 is affixed to a plate 10 attached to the arm 4 and this plate or flat bar 10 has secured thereto the depending cylinder 9, having ports 11 and 12 which are at opposite ends of a cylinder and are connected to pipes 13 and 14, the other ends of said pipes being connected with a control valve 15, the valve casing having lugs 16 (Fig. 10) by means of which the control valve is attached to the arm 4. The control valve 15 comprises a casing 17 which has therein a freely movable cut off or spool valve 18 that has a centrally located disk 19 and adjacent to each end, heads 20 and 21. The spool valve 18 reciprocates to open and close ports, under pressure from the main line of air supply through pipe 22 that enters a way 23 having end openings 24 and 25, and a central opening 26. The way 23 has adjustable screws for controlling the transverse area of the way. The pipes 13 and 14 from the cylinder 9 are connected to the valve casing and communicate with the ports 27 and 28 on opposite sides of the central disk 19 and there are provided exhaust ports 29 and 30.

The heads 31 and 32 of the control valve 15 each have apertures 33, which communicate with a valve chamber 34, that is closed by suitable plugs against which abut the ends of springs that press ball valves upon their seats, and beyond the valve seats are exhaust openings 35. The heads 31 and 32 have openings or guide ways located below the ball valves for the reception of pins 36 and 37, which when the transfer arm is lowered, alternately lift the valves off their seats by engaging properly spaced projections or posts 38 and 39, (Figs. 8 and 9). When the ball valves are lifted from their seats alternately, communication is established which will release the pressure at one end which permits movement of the spool valve so that air under pressure will enter and actuate the piston in cylinder 9 to open or close the clamping jaws 6 that engage with the parison when it has been lifted and partially projected from the parison receiver or mold. The operation of this valve is entirely automatic.

The transfer arm 4 is associated with a maintaining frame 40 (Figs. 8 and 9) to the upper portion of which is attached a vertical cylinder 41, the piston rod 42 thereof having its lower end attached to the end of the arm 4 beyond the control valve 15, and in line with the piston rod 42 there is a short leveling or guiding piston rod 43, that engages with the under side of a cross-piece 44 of an open frame 45 having guide bars 46 which pass through apertures in the arm 4, the piston rod 42 passing through an opening in the upper crosspiece 47 of the frame 45.

The two alined piston rods 42 and 43 serve as pivots upon which the arm 4 turns or oscillates, to carry the plastic partly shaped charge of molten glass from the table 1 to table 2. The frame 45 is oscillated by the piston rod 47′ of a cylinder 48, said piston rod being connected in any suitable manner as by a movable connection which engages an angular pin 49. The lower transverse bar 44 of the frame 45 carries an adjustable trip 50, the function thereof being to change the position of a control valve 51 by means of which air under compression which is admitted to the vertical lifting cylinder 41. The valve 51 receives air under compression through the branch pipe 52, and pipes 53 and 54 connected to the casing of the valve 51 lead to the ends of the cylinder 41. It will be understood that the air pipes which are connected to moving parts will be flexible tubes.

The casing for the valve 51 is also connected to the lower end of the cylinder of a "kick-out" piston for the press-molds on table 1, by a pipe 55. The parison molds and the blowing molds are of usual construction, and in use the parison molds have stations on the tables 1 and 2 which are at different distances apart and are associated with means for filling the parison molds and ejecting the partially formed parison therefrom which is grasped by the jaws and carried to the blowing molds, the air supply therefor being connected to communicate with apertures through table 2 at a predetermined blowing station.

It will be understood that the molds of table 1 have the usual means for pushing up the parison after the neck has been formed, this being done prior to transfer by the carrier to the blow mold.

The frame 40, (see Fig. 2), serves as a support for a vertical reciprocatory rod 56 having thereon an adjustable collar 56′ and when the arm 4 is raised, the upper end of the rod engages a pin 57, of a one-way valve 58 and lifts the ball thereof from its seat, permitting air under compression to be supplied to the cylinder 48 through branch pipe 59, the valve casing having therein the valve 58, and through pipe 60, to move the piston rod which turns the frame 45 in one direction, the piston rod being moved in an opposite direction by the pressure admitted through the pipe 61.

The casing or cylinder 62 contains a piston head 63 having thereon a stem 64, and this casing or cylinder has near its lower head, a port for the pipe 55 from one end of the casing for the valve 51, and the lower head of the casing has a port which is connected by a pipe 65 with one end of the cylinder that intermittently rotates the blowing table, said pipe 65 having branches or leads 59, 66 and 52.

The casing 62 has a port near its upper end to which is connected a branch 67 of pipe 61 that leads to one end of the drive cylinder for the blowing table 2, the pipe 61 having a branch 67' that communicates with the leveling cylinder 43' beneath the piston head having thereon the piston rod 43.

The parison receiving molds on table 1 have their stations above openings through said table, and such molds have movable bottoms that are engaged by the piston rod of the piston 63 in cylinder 62. The movable bottom of the parison receiving mold and the piston rod constitute a kick-out for the parison, which is raised with its movable bottom to project above the parison-mold in position where the parison can be engaged with the jaws of the transfer arm, and when grasped thereby the partly shaped parison is lifted and carried to position above the station of the blowing mold in which the parison is deposited.

It will be noted that the supply of compressed air for the control valve 15 on the arm 4 is through a pipe 68, and its branch 22, which is under constant pressure and that the control valve 15 is vented or bled only when the ball valves are lifted off their seats by the pins 36 and 37 engaging with the projections or blocks 38 and 39 on the fixed frame or support 40, and that air under compression to operate the hereinbefore described parts is supplied by way of the pipes and their branches which communicate with the cylinder for turning the blowing table.

The piston for turning the table 1 is driven from an independent line which is opened and closed by cams operated in the usual way to open and close the ports at proper intervals.

Parts not fully illustrated may be of well known construction, for instance, as set forth in the United States patent heretofore mentioned, my specific improvement relating more particularly to the transfer arm and its operating means, as shown.

When the arm of the transfer has been raised to the predetermined height, an end portion of the arm engages a collar on a vertical rod and lifts a valve from its seat which admits air to a horizontal cylinder that moves the arm to position that locates the parison directly above the blow-mold on the adjacent table. A bumper or trip attached to an oscillatory frame engages the stem of a fixed control valve to admit air into the vertical cylinder to force downward the piston rod which lowers the arm and opens a port of a control valve to admit air into cylinder that operates the clamping jaws to deposit the parison carried by the clamp into the blow-mold on the blowing table, after which and at the proper time the transfer being moved automatically to position to repeat the operation, and it will be noted that the air supply is mainly through pipes connected with the step by step movement of the blowing table.

The transfer mechanism is adapted for use with numerous forms of glass working machines having parison receiving and blowing molds, and the means employed for effecting the vertical and horizontal movements of the transfer is such that the initial lifting of the transfer above the tables provides for clearance of the lifted parison when the same is being carried into position, and that when the transfer has been oscillated to locate the parison held by the clamping jaws, the dip or drop movement takes place and release of the parison is effected by means associated with the arm, such means including a valve actuated by contacts which open vents by engagement with spaced apart contacts positioned to be moved to lift the valves which normally close the vents or ports. It will be readily understood that the table which carries the blowing molds is moved to position such blowing mold in alinement with the blowing nozzle that is usually located to operate after the table has made one or more advances in the direction of its rotation.

The hereinbefore described transfer for glass working machines is applicable to many makes of bottle and jar forming machines and with many different forms of blowing molds, and as the transfer has only vertical and horizontal movements, it can be worked at a high rate of speed without detriment to the plastic contents of the molds. In this application, the term "parison mold" refers to the mold which receives a definite quantity of the molten glass which is sufficient to form a jar or other like article.

I claim:

1. A parison transfer for glass working machines comprising an arm provided at one end with a downwardly extending portion, a pair of parison engaging jaws which are pivotally attached to said downwardly extending portion of the arm, a member attached to the arm to extend upwardly and over said downwardly extending portion of the arm, a cylinder attached to said member, a piston having a piston rod connected with the jaws, a casing for a control valve attached to the arm, means depending from the casing for unseating valves to control the movement of the piston connected with the jaws, and oscillatory frame which engages the arm, and pneumatically controlled means for raising and lowering the arm.

2. In a mold transfer device for glass working machines, a transfer arm comprising a bar which is bent to dispose one end below the plane of the opposite end, a pair of jaws pivoted to the lower end of the arm, a bar having an upwardly extending bend, a cylinder attached to the bar, a piston and piston rod, the piston rod having a transverse pin for engagement with slotted members of the jaws, a control valve casing carried by the arm, a reciprocatory valve maintained within the casing, spring seated valves alining with reciprocatory pins, stations fixedly attached to a frame with which the pins may engage when the transfer arm is in lowered position to effect an opening or a closing of the jaws by the admission of air under pressure from the control valve to the piston, pneumatically controlled means for oscillating the frame which is engaged by the transfer arm, and means for raising and lowering the transfer arm.

JAMES S. MOORE.